United States Patent [19]

Thomas

[11] Patent Number: 5,018,752
[45] Date of Patent: May 28, 1991

[54] SHAFT SEAL

[75] Inventor: Larry D. Thomas, Beatrice, Nebr.

[73] Assignee: Hoover Group, Inc., Alpharetta, Ga.

[21] Appl. No.: 511,297

[22] Filed: Apr. 19, 1990

[51] Int. Cl.⁵ .......................... F16J 15/32; F16J 9/06
[52] U.S. Cl. .................................. 277/152; 277/187;
277/205; 277/212 F; 277/212 R
[58] Field of Search ................... 277/152, 102, 212 F,
277/212 R, 212 C, 205, 187

[56] References Cited

U.S. PATENT DOCUMENTS 2,981,573  6/1956  Reuter .......................... 277/152 X
4,553,761  11/1985 Blesing et al. ...................... 277/152

FOREIGN PATENT DOCUMENTS 3501906  9/1985  Fed. Rep. of Germany ...... 277/152

Primary Examiner—William A. Cuchlinski, Jr.
Assistant Examiner—James Folker
Attorney, Agent, or Firm—Harness, Dickey & Pierce

[57] ABSTRACT

A shaft seal consisting of a generally tubular hollow body formed of plastic and having lip seal portions at each end. Flexure grooves in the body enable lip seals on the inner surface of the body to be biased into sealing engagement with a shaft extending through the seal body.

5 Claims, 2 Drawing Sheets

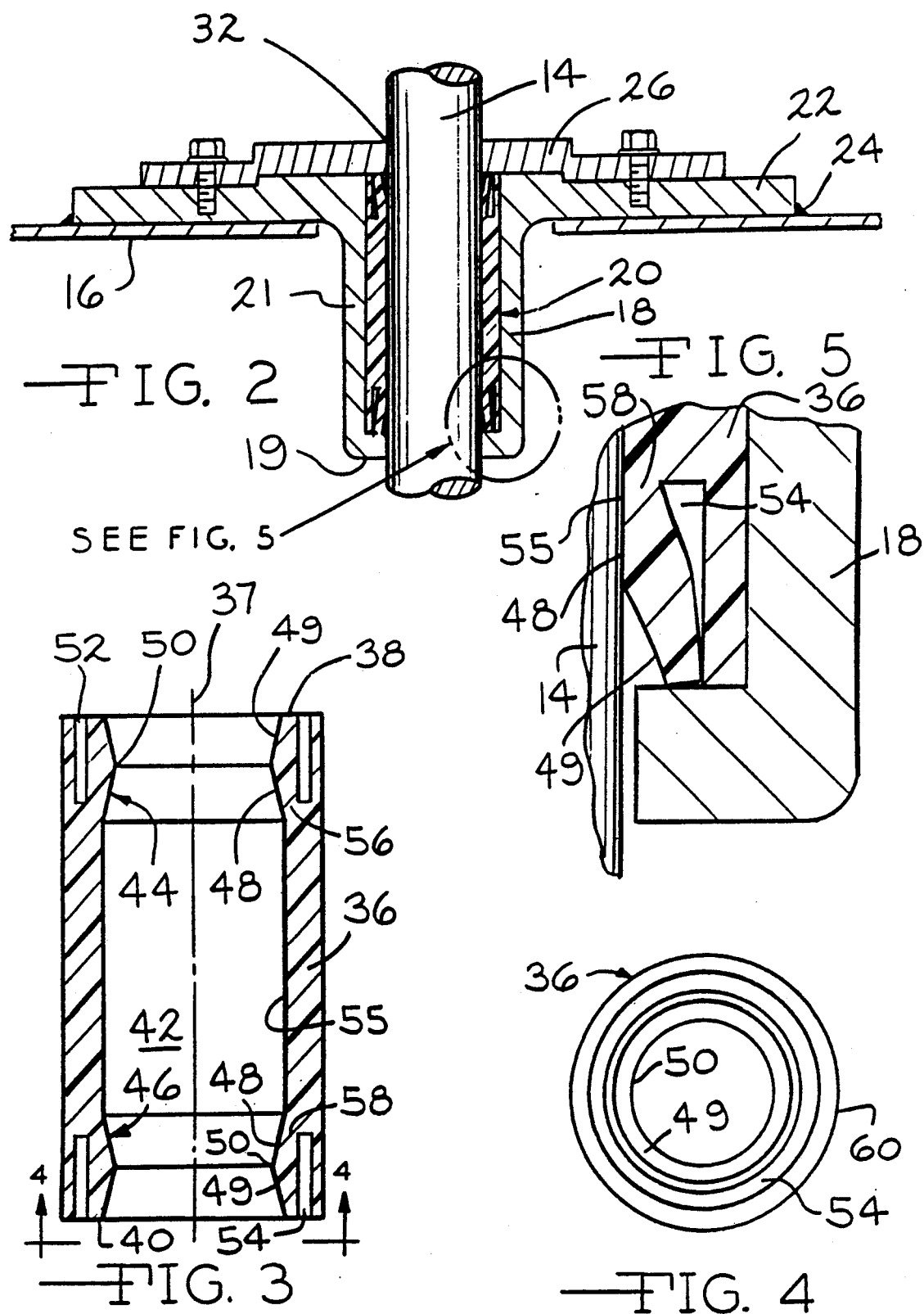

SHAFT SEAL

BACKGROUND AND SUMMARY OF THE INVENTION

This invention relates to a shaft seal and more particularly to a one-piece shaft seal which effectively functions as both a seal and a bushing for the shaft.

The seal of this invention functions as a replacement for conventional packing elements, which also act as both the seal for the shaft and the bushing for the shaft. The conventional packing elements are used by forcing them into a housing and compressing them with an adjustable retainer. This process, by its nature, creates a tradeoff situation. The greater the compression from the retainer, the better the packing will seal the shaft. Unfortunately, the greater the compression, the more difficult it is to rotate the shaft in the packing.

A happy medium must be reached in order for the assembly to operate properly. If the packing is too tight, it builds excessive heat from the friction, assuming that the drive has enough power to turn the shaft. In the event the packing is too loose, the seal leaks while the shaft is able to wobble. The "happy medium" is reached only after trial and error has found the best compression. And even then, the packing must be installed, run-in to seat the packings, and then retightened.

The one-piece seal of this invention eliminates the problematic steps that are associated with the use of packings. This is accomplished by having the seal be both the seal and the bushing. The center section of the seal is the proper diameter to be the bushing that is required to support the shaft during operation. While the ends of the seal have a lip seal geometry built into them that allows the seals to stetch over the shaft during installation. This stretch provides the necessary radial compressive force required to effect a seal in both static and dynamic modes. The stretch is possible because a groove in each end of the seal enables the seal ends to expand to the size of the shaft while the diameter of the bushing area of the seal remains constant.

The seal of this invention may require cleaning after use. However, the process of cleaning and changing the seal of this invention compared with a packing type seal is much simpler, faster, less expensive, and less likely to be done incorrectly. The woven packing absorbs product between its fibers. Since there is no way to see inside the packing to check for product that may still be in a clean packing, the packing must simply be replaced in order to guarantee that there is no contamination in the next useage.

The one-piece seal can be cleaned with the same automatic equipment that cleans the other parts of the tank in which the seal is installed. A simple visual inspection clearly shows if the seal is clean or not. If clean, install. If not, either install with the contaminated end away from the product or replace the seal. Replacing the seal requires none of the run-in and re-adjustment that is required of the packing. Once installed, it is ready to use immediately.

Specifically, the seal made in accordance with the preferred embodiment of this invention has an annular hollow body which defines a bushing cavity therein and which further defines a lip seal portion and flexure grooves at each end thereof. The lip seal portion and flexure grooves co-operate to allow the secure containment of the shaft within the containment cavity and provides effective sealing force even when the shaft is not perfectly straight. The entire shaft seal assembly is disposed within a receiving member which prevents communication between the seal and the contained material. Therefore the seal may not need to be cleaned after different materials are placed within the container.

These and other aspects, features, advantages, and objects of this invention will be more readily understood upon reviewing carefully the following detailed description in conjunction with the accompanying drawings and appended claims.

BRIEF DESCRIPTION OF THE DRAWINGS

For a more complete understanding of the present invention relative to the advantages thereof, reference is now made to the following description taken in conjunction with the accompanying drawings. In describing the overall invention, reference will be made to the accompanying drawings wherein like numerals in the various figure refer to the same or similar elements or features and in which:

FIG. 2 is an enlarged fragmentary vertical sectional view of the seal shown in FIG. 1;

FIG. 3 is a vertical sectional view of the seal of this invention;

FIG. 4 is an end view of the seal of this invention as seen from substantially the line 4—4 in FIG. 3; and FIG. 5 is an enlarged fragmentary view of a portion of the seal structure shown in FIG. 2.

DETAILED DESCRIPTION OF THE INVENTION

Figure 1:
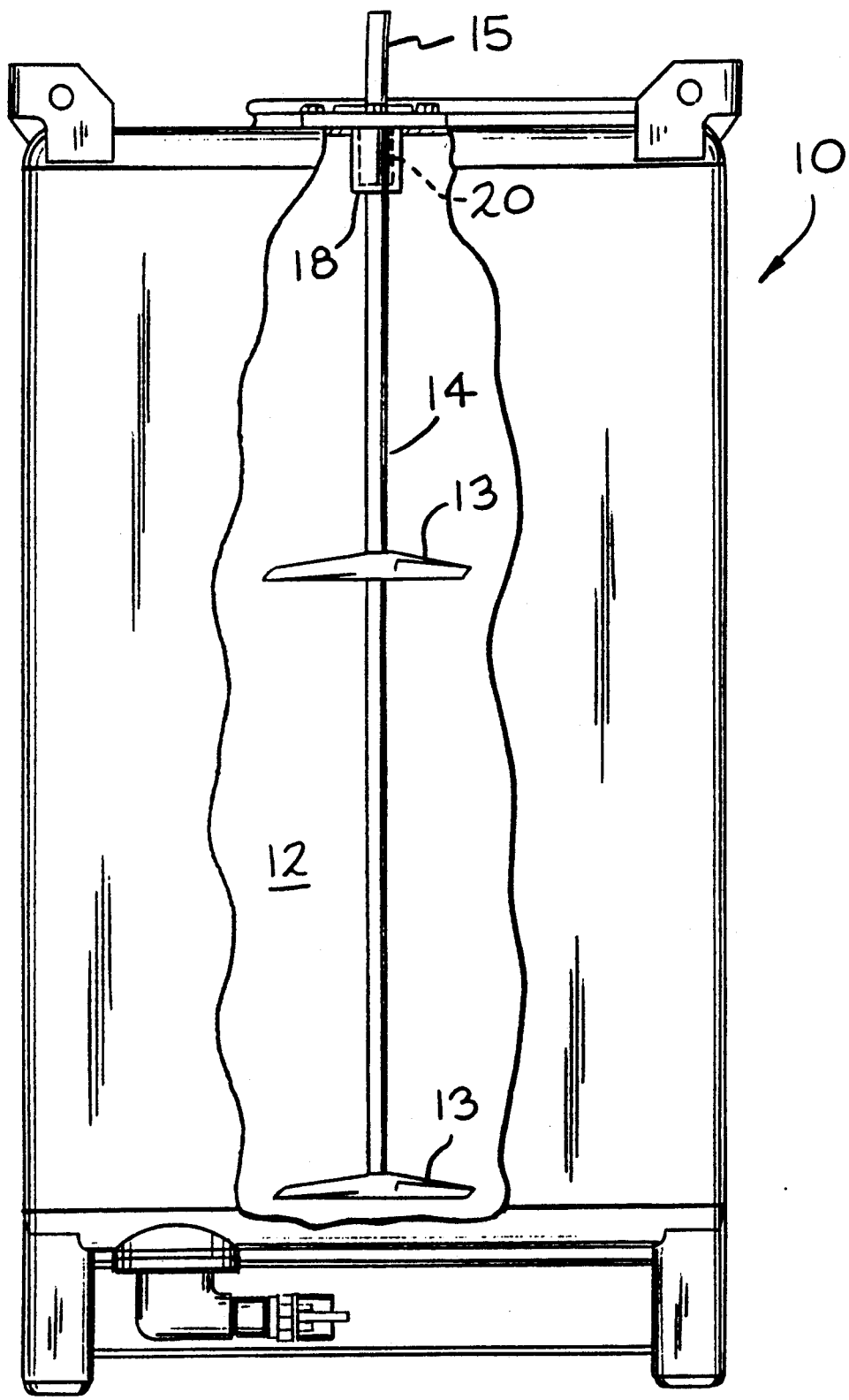
FIG. 1 is a side elevational view of tank with a portion of a tank sidewall broken away to show a seal of this invention in assembly relation with a shaft in the tank.

Referring now to FIG. 1, there is shown a container, namely a tank 10, into which a material 12 (i.e. such as paint) is disposed and further having a rotatable shaft 14 having its upper end 15 connected to a source of rotating energy (not shown) in the usual manner. Specifically the shaft 14 carriers the mixing blades 13 and is made to rotate within the tank 10 to provide for mixing or agitating the liquid tank contents 12.

As shown best in FIG. 2, the shaft 14 extends upwardly through a tubular housing 18 in which the seal 20 of this invention is press fit. The housing 18 has a bottom wall 19 and a sidewall 21 having a radially outwardly extending flange 22 which is secured to the top wall 16 of the tank 10 by welding 24. The upper end of the housing 18 is open so that the seal 20 can be inserted downwardly into the housing. A cover plate 26 is bolted to the flange 22 so as to retain the seal 20 in the housing 18. An opening 32 in the cover 26 allows the shaft 14 to pass through plate 26 and into the tank 10.

As best shown in FIGS. 3 and 4, the seal 20 consists of an elongated hollow annular body 36 preferably made of a moldable material such as Teflon or other plastic material which has a low coefficient of friction and is easily cleanable. The body 36 has a longitudinal axis 37 and open ends 38 and 40. An axial shaft receiving cavity 42 is formed in the body 36 in communication with and extending between the ends 38 and 40. The body 36 is also configured to provide lip seal portions 44 and 46 which project into the cavity 42 at ends 38 and 40, respectively.

Each lip seal portion 44 and 46 includes radially inwardly converging straight surfaces 48 and 49 which terminate in an annular edge or lip 50 concentric with the seal axis 37. The lips 50 for the seal portions 44 and 46 are aligned and positioned on a predetermined precise radius with respect to the axis 37.

The seal portions 44 and 46 are surrounded by deep flexure grooves 52 and 54, respectively, which provide for the cantilever-like mounting of the seal portions 44 and 46 on narrow annular portions 56 and 58, respectively, of the body 36. This structure allows each of the seal portions 44 and 46 to flex in a direction to move the seal edge 50 radially of the axis 37. The result is a seal body 36 which can function effectively with the shafts 14 within a wide range of tolerances and with shafts 14 that are not perfectly straight.

The seal body 36 is manufactured by standard injection molding techniques. Importantly, the flexure grooves 52 and 54 are of substantially the same length as the seal portions 44 and 46, respectively, and are in close proximity to the seal surfaces 48 and 49 so that the seal portions 44 and 46 can flex toward and away from the axis 37. The grooves 52 and 54 are of a size and location to narrow the annular support portions 56 and 58 between the inner ends of the grooves 52 and 54 and the seal surfaces 48 so that the seal portions can flex sufficiently to bias the seal edges 50 into engagement with the shaft 14.

The grooves 52 and 54 are also wide enough to allow the seal portions 44 and 46 to stretch radially outwardly over the shaft 14. As shown in FIG. 5, the portions 44 and 46 stretch to positions in which the seal surfaces 48 are substantially aligned with the tubular surface 55 of the central bushing area of the seal body 36 between the lip seal portions 44 and 46.

In the use of the seal 20, it is press fit in the housing 18 and the shaft 14 is then extended axially through the seal cavity 42. The continuous cylindrical shape of the outer surface 60 of the seal body 36 facilitates its insertion into housing 18, in which the end wall 19 and the cover 26 only loosely engage the body 36 so as not to impede flexing of the seal portions 44 and 46. The seal portions 44 and 46 flex on the body support portions 56 and 58 to positions in which the seal edges 50 securely engage spaced portions of the shaft 14. The shaft 14 thus rotates freely in the seal 20 supported in the bushing surface 55 and the seal surface portions 48 at the ends of the bushing surface 55, without any of the container contents traveling up the shaft 14 past the seal 20.

It is to be understood that the invention is not limited to the exact construction or method illustrated and described above, but that various changes and modifications may be made without departing from the spirit and scope of the invention as defined in the following claims.

What is claimed is:

1. A shaft seal comprising a generally tubular plastic body having a pair of ends and longitudinal axis extending through said ends, said body having an axial cavity extending therethrough and a seal portion formed adjacent each of said ends of said body and projecting into and further defining said cavity, each said seal portion being integral with said body and being connected thereto by a narrow support portion which enables said seal portion to flex relative to the remainder of said body in a direction toward and away from said axis, and each said seal portion including annular radially inwardly converging surfaces which terminate in an edge engageable with a shaft extending axially through said body, each said seal portion being flexed away from said axis by each said edge engaging the shaft when the shaft is so extended, each said edge being biased in sealing engagement with the shaft when each said seal portion is flexed away from said axis, said seal portions being generally aligned in the direction of said axis upon being flexed.

2. The shaft seal according to claim 1 wherein said body has flexure grooves formed in the ends thereof and corresponding to said seal portions, each said groove being in an encircling relation with its corresponding seal portion, and said grooves being substantially concentric with said longitudinal axis and extending longitudinally inwardly of said body to a position adjacent said seal support portions so that the width and location of each groove in said body determines the narrowness of said support portion for the corresponding seal portion, said seal portions being flexed into said grooves upon the shaft being extended through said cavity.

3. The shaft seal according to claim 2 wherein said converging surfaces of each seal portion are substantially flat.

4. The shaft seal according to claim 2 wherein said has an exterior surface which is of a substantially uninterrupted cylindrical shape between the ends of said body to facilitate enclosure of said seal body in a hollow housing.

5. The shaft seal of claim 3 wherein said body cavity between said seal portions is of substantially constant predetermined diameter and the inner ones of said converging surfaces are movable to positions in which they constitute end-wise extensions of said cavity of substantially the same predetermined diameter when said seal portions are flexed outwardly to accommodate a shaft extending axially through said body and rotatably supported in said body at a position between said seal portions.

* * * * *